(12) United States Patent
Bernhardt et al.

(10) Patent No.: US 9,934,685 B1
(45) Date of Patent: Apr. 3, 2018

(54) DIRECTIONAL TRAFFIC NOTIFICATIONS OF APPROACHING PRIORITY VEHICLES

(71) Applicant: International Business Machines Corporation, Armonk, NY (US)

(72) Inventors: Bradley A. Bernhardt, Benson, AZ (US); Thomas J. Fleischman, Poughkeepsie, NY (US); Richard Hutzler, Tucson, AZ (US); Mitchell Montanez, Tucson, AZ (US); William K. Morse, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/724,542

(22) Filed: Oct. 4, 2017

Related U.S. Application Data

(63) Continuation of application No. 15/484,496, filed on Apr. 11, 2017.

(51) Int. Cl.
| | |
|---|---|
| *G08G 1/0967* | (2006.01) |
| *G08G 1/095* | (2006.01) |
| *G08G 1/087* | (2006.01) |
| *G08G 1/0965* | (2006.01) |

(52) U.S. Cl.
CPC ....... *G08G 1/096783* (2013.01); *G08G 1/087* (2013.01); *G08G 1/095* (2013.01); *G08G 1/0965* (2013.01)

(58) Field of Classification Search
CPC .. G08G 1/096783; G08G 1/095; G08G 1/087; G08G 1/0965
See application file for complete search history.

(56) References Cited

U.S. PATENT DOCUMENTS

| | | |
|---|---|---|
| 4,775,865 A | 10/1988 | Smith et al. |
| 4,914,434 A | 4/1990 | Morgan et al. |
| 6,448,904 B1 | 9/2002 | Flores |
| 6,958,707 B1 | 10/2005 | Siegel |

(Continued)

OTHER PUBLICATIONS

Appendix P, List of IBM Patents or Patent Applications Treated as Related, 2 pages, dated Oct. 5, 2017.

(Continued)

*Primary Examiner* — Mohamed Barakat
(74) *Attorney, Agent, or Firm* — Christopher McLane

(57) ABSTRACT

In an approach for notifying, a computer receives one or more preemption notifications, wherein the one or more preemption notifications are associated with one or more priority vehicles. The computer identifies a device that is within range of the received one or more preemption notifications, wherein the device includes one or more directional indicators. The computer one or more directions of approach associated with the received one or more preemption notifications relative to the identified device. The computer determines a number of approaching priority vehicles associated with each instance of the identified one or more directions of approach relative to the identified device. The computer initiates to display through the one or more directional indicators of the identified device the identified total number of approaching priority vehicles associated with the one or more identified directions of approach relative to the identified device.

1 Claim, 9 Drawing Sheets

(56) References Cited

U.S. PATENT DOCUMENTS

| | | | | |
|---|---|---|---|---|
| 7,327,280 | B2* | 2/2008 | Bachelder | F41G 9/00 |
| | | | | 340/902 |
| 7,629,898 | B2 | 12/2009 | Kirkpatrick | |
| 7,864,071 | B2 | 1/2011 | Bachelder et al. | |
| 8,223,037 | B2 | 7/2012 | Grotendorst et al. | |
| 8,723,680 | B1 | 5/2014 | Baker | |
| 9,146,121 | B2 | 9/2015 | Husain | |
| 9,249,742 | B2 | 2/2016 | Sangameswaran et al. | |
| 2004/0140910 | A1 | 7/2004 | Jordan | |
| 2007/0046499 | A1* | 3/2007 | McKenna | G08G 1/0965 |
| | | | | 340/902 |
| 2010/0182164 | A1* | 7/2010 | Diba | G08G 1/095 |
| | | | | 340/907 |
| 2011/0109477 | A1* | 5/2011 | Edwardson | G08G 1/087 |
| | | | | 340/906 |
| 2011/0193722 | A1* | 8/2011 | Johnson | G08G 1/081 |
| | | | | 340/906 |
| 2015/0310737 | A1* | 10/2015 | Simanowski | G08G 1/081 |
| | | | | 340/910 |

OTHER PUBLICATIONS

Bernhardt et al., "Directional Traffic Notifications of Approaching Priority Vehicles", U.S. Appl. No. 15/484,496, filed Apr. 11, 2017, 55 pages.

\* cited by examiner

DIRECTIONAL TRAFFIC NOTIFICATIONS OF APPROACHING PRIORITY VEHICLES

BACKGROUND

The present invention relates generally to the field of traffic control and more particularly to notifying vehicles and/or pedestrians of an approaching priority vehicle with directional information.

Traffic lights, also known as traffic signals, traffic lamps, traffic semaphore, signal lights, stop lights, robots, and traffic control signals, are signaling devices positioned at road intersections, pedestrian crossings, and other locations to control and coordinate traffic flow to ensure smooth and safe movement. The normal timing of the traffic signal (i.e., time plans that sometimes range from 35 seconds to 120 seconds in length) may be interrupted through traffic signal preemption. Traffic signal preemption (e.g., traffic signal prioritization) is a type of system that allows the normal operation of traffic lights to be preempted (i.e., replaces normal traffic light timing sequence with an altered timing sequence based on notification of an event occurring that takes precedence over the current conditions). For example, an emergency vehicle manipulates traffic signals by halting conflicting traffic and allowing the emergency vehicle right-of-way. Additionally, traffic signal preemption can also be used by light-rail and bus rapid transit systems to allow public transportation priority access through intersections, or by railroad systems at crossings to prevent collisions. Traffic preemption devices can be installed on road vehicles, integrated with train transportation network management systems, or operated by remote control from a fixed location, such as a fire station, or by a 9-1-1 dispatcher at an emergency call center.

Traffic preemption devices are implemented in a variety of ways (e.g., acoustic sensors, line-of-sight, Global Positioning System (GPS), radio based, etc.). Traffic preemption systems equipped with acoustic sensors override the traffic signal upon detection of a specific pattern of tweets or wails from the siren of an emergency vehicle. Line-of-sight traffic signal preemption systems send a narrowly directed signal forward towards traffic lights from individual equipped vehicles, in an attempt to obtain right-of-way through controllable intersections prior to arrival at the intersection. Traffic preemption systems implemented with a Global Positioning System (GPS) determine a location of the activating vehicle, a direction in which the vehicle is heading, identify which traffic lights to preempt, and an ability to activate the identified traffic lights. Radio-based traffic-preemption systems are installed in vehicles, and use a local, directional, short-range radio signal in which the operating range can be adjusted to activate only nearby, traffic signals, or traffic signals at greater distances.

SUMMARY

Aspects of the present invention disclose a method, computer program product, and system for notifying, the method comprises one or more computer processors receiving one or more preemption notifications, wherein the one or more preemption notifications are associated with one or more priority vehicles. The method further comprises one or more computer processors identifying a device that is within range of the received one or more preemption notifications, wherein the device includes one or more directional indicators. The method further comprises one or more computer processors identifying one or more directions of approach associated with the received one or more preemption notifications relative to the identified device. The method further comprises one or more computer processors determining a number of approaching priority vehicles associated with each instance of the identified one or more directions of approach relative to the identified device. The method further comprises one or more computer processors initiating to display through the one or more directional indicators of the identified device the identified total number of approaching priority vehicles associated with the one or more identified directions of approach relative to the identified device.

DETAILED DESCRIPTION

Embodiments of the present invention recognize that intersections equipped with traffic preemption systems may include an additional light that is visible to traffic approaching from each direction, which flashes or stays on in order to notify drivers of vehicles and/or pedestrians of the approach of an emergency vehicle. Embodiments of the present invention recognize that rail road crossings and intersections with light rail transit systems utilize drop down arms and/or flashing warning lights that indicate an approach of a train or light rail transit, to drivers and/or pedestrians. However, embodiments of the present invention recognize that not all intersections, rail road crossings, and light rail transit intersections are equipped to indicate the approach of an emergency vehicle, a train, or light rail transit, which may result in accidents. Additionally, embodiments of the present invention recognize that while the traffic preemption systems may provide an indication of an approaching emergency vehicle, train, or light rail transit, the traffic preemption system does not identify a specific direction from which the emergency vehicle, train, or light rail transit approaches which may result in accidents and/or delays to response times of the emergency vehicle if unnoticed by a driver and/or pedestrian. Embodiments of the present invention also recognize that traffic preemption systems and are not equipped to handle the approach of multiple emergency vehicles from different directions.

Embodiments of the present invention incorporate additional warning lights to traffic signals, rail road crossing signals, and light rail transit caution signals equipped with traffic preemption systems to identify a direction or multiple directions associated with approaching emergency vehicles, trains, or light rail transits to drivers and/or pedestrians, thereby increasing response times, and reducing the chances of additional accidents. Embodiments of the present invention also allow equipped vehicles (i.e., factory installed, retrofitted vehicles, and/or portable notification devices) to receive notifications from traffic preemption systems regarding approaching emergency vehicles, trains, or light rail transits. Vehicles equipped with the present invention, notify drivers of the approach and direction of the emergency vehicle, train, or light rail transits, in areas without traffic preemption system and/or to act as secondary warning system (e.g., back up) to traffic signals at equipped intersections. For example, in a rural area at a four way stop an ambulance approaches with sirens. The driver hears the sirens, but is unable to determine a direction from which the ambulance approaches. However the vehicle receives the notification, and notifies the driver of the approaching ambulance and direction, so that the driver can respond appropriately.

Figure 1:
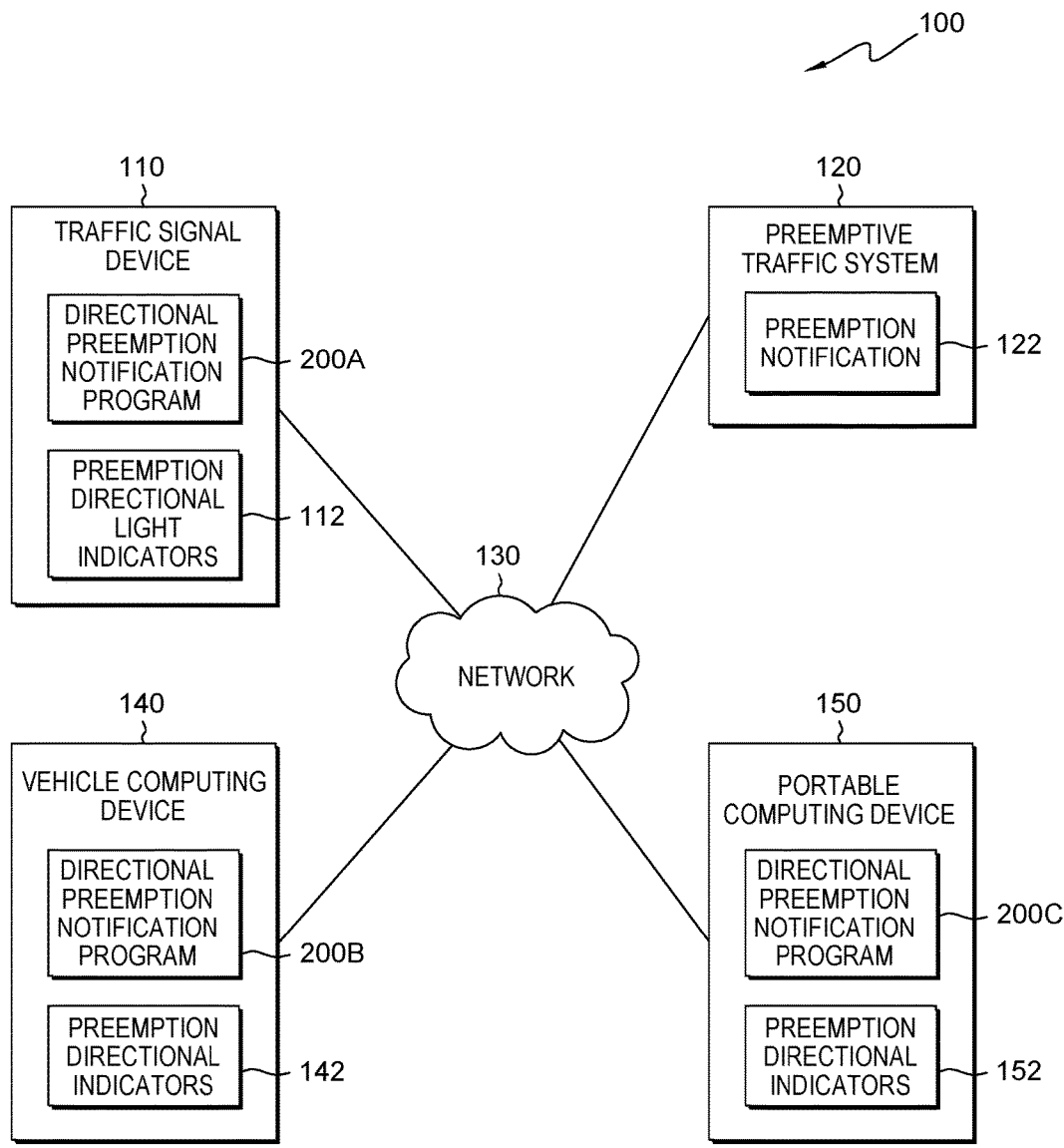
FIG. 1 is a functional block diagram illustrating a traffic preemption processing environment, in accordance with an embodiment of the present invention.

The present invention will now be described in detail with reference to the Figures. FIG. 1 is a functional block diagram illustrating a traffic preemption processing environment, generally designated 100, in accordance with one embodiment of the present invention. FIG. 1 provides only an illustration of one embodiment and does not imply any limitations with regard to the environments in which different embodiments may be implemented.

In the depicted embodiment, traffic preemption processing environment 100 includes traffic signal device 110, vehicle computing device 140, portable computing device 150, and preemptive traffic system 120 interconnected over network 130. Traffic preemption processing environment 100 may include additional computing devices, mobile computing devices, servers, computers, storage devices, or other devices not shown.

Traffic signal device 110 is a visual signal (e.g., street intersection traffic signal, a pedestrian signal, a railroad crossing signal, and/or a light rail transit crossing signal, etc.) that controls the flow of traffic at an intersection through lights of color (e.g., red, yellow, green) in a sequence of color phases. Additionally, traffic signal device 110 includes preemption directional light indicators 112, which notifies a driver and/or pedestrian of the number of an approaching emergency vehicles, trains, and/or light rail transit and an associated direction (e.g., left, right, in front, behind) with respect to the vehicle and/or intersection. In some embodiments, traffic signal device 110 also includes a crossing arm (e.g., railroad gate and red flashing lights) that notifies and prohibits vehicles and/or pedestrians from crossing the railroad tracks, by lowering the crossing arm thereby blocking the path from travel. In some other embodiments, traffic signal device 110 includes one or more of the aforementioned embodiments. In the depicted embodiment, traffic signal device 110 is a separate control system. In another embodiment, traffic signal device 110 may include preemptive traffic system 120. Traffic signal device 110 receives information from preemptive traffic system 120 (e.g., preemption notification 122) to alter the traffic signal and/or preemption directional light indicators 112 responsive to the approach of emergency vehicles, trains, and/or light rail transit. Traffic signal device 110 includes directional preemption notification program 200 and preemption directional light indicators 112.

Preemption directional light indicators 112 are one or more lights that present a visual cue to a driver of a vehicle, a driver of a train, a driver of a light rail transit, and/or pedestrians approaching an intersection with a traffic signal, a pedestrian signal, a rail road crossing, and/or a light rail transit crossing, to indicate the approach and direction of approach of priority vehicles (e.g., emergency vehicles, trains, and/or light rail transits) in addition to standard lights of color (e.g., red, yellow, green). For example, a pedestrian signal currently indicates walk or don't walk and may include a countdown time. Preemption directional light indicators 112 may be added to the pedestrian signal, as a different icon (i.e., icon identifies the type of approaching priority vehicles) and/or a letter (e.g., left (L), right (R), forward (F) and back (B) or arrow that indicates the direction of approach in place of the countdown time. A priority vehicle is a vehicle such as an emergency vehicle (e.g., fire truck, ambulance, police car), train, and or light rail transit, that when active (e.g., lights flashing, sirens sound, train is moving, etc.) are afforded the right of way on a street or at an intersection over a moving passenger vehicle and/or pedestrians. Preemption directional light indicators 112 provide visual cues based upon one or more of: an illuminated color, number of lights illuminated, a position of the illuminated light with respect to the street intersection traffic signal, rail road crossing signal, and/or light rail transit crossing signal, and a strobe rate (i.e., speed or frequency at which a light transitions between off and on). Example embodiments of preemption directional light indicators 112 as depicted and explained in greater detail with respect to FIG. 3A, FIG. 3B, FIG. 5, and FIG. 6A. Preemption directional light indicators 112 initiate responsive to information from directional preemption notification program 200.

Vehicle computing device 140 may be any electronic device or computing system capable of processing program instructions and receiving and sending data that is installed in a vehicle. Vehicle computing device 140 is an in-vehicle information system that provides information to the driver through the dashboard and/or computer console displays of the vehicle that pertain to at least operating information and/or conditions of the vehicle such as vehicle diagnostics (e.g., warning lights, tire pressure, check engine lights, emissions), automotive gauges (e.g., speedometer, odometer, temperature, battery indicator, etc.), vehicle information and/or notifications (e.g., fuel economy, oil change notices, average speed, etc.). In some embodiments, vehicle computing device 140 also includes one or more of the following: specialized traffic information systems, a GPS navigation system (e.g., for cars with drivers or driverless cars), lane departure warnings, blind spot detection systems, collision avoidance, dashboard camera, back-up camera system, mobile phone services that connect to portable devices (e.g., portable computing device 150, mobile phone, etc.), warning systems, and emergency help systems that provide additional information, resources, and capabilities to the driver of the vehicle.

In one embodiment, vehicle computing device 140 is a factory installed computing device within the vehicle. In another embodiment, vehicle computing device 140 is a retrofitted computing device (e.g., installed by the vehicle manufacturer as a new or modified part or equipment that was not available or considered necessary at the time of manufacture). In some other embodiment, vehicle computing device 140 is an aftermarket add on computing device (i.e., a secondary market product concerned with the manufacturing, remanufacturing, distribution, retailing, and installation of all vehicle parts, equipment, and accessories, after the sale of the automobile by the original equipment manufacturer (OEM) to the consumer) that the owner of the vehicle installs within the vehicle to add capabilities and/or to improve existing capabilities. Vehicle computing device 140 is any programmable electronic device capable of communicating with network 130. In other embodiments, vehicle computing device 140 may represent a server computing system utilizing multiple computers as a server system, such as in a cloud computing environment. In general, vehicle computing device 140 is representative of any electronic device or combination of electronic devices capable of executing machine readable program instructions as described in greater detail with regard to FIG. 8, in accordance with embodiments of the present invention. Vehicle computing device 140 contains preemption directional indicators 142 and an instance of directional preemption notification program 200.

Portable computing device 150 may be any electronic device or computing system capable of processing program instructions and receiving and sending data that is portable (i.e., any device that is capable of being hand carried, thereby transferring the device from one location to another location for utilization). In some embodiments, portable computing device 150 may be a laptop computer, a tablet computer, a netbook computer, a personal computer (PC), a desktop computer, a personal digital assistant (PDA), a smart phone, a hand held global navigation system device, a portable heads up display, a portable traffic preemption notification device, or any programmable electronic device capable of communicating with network 130. In other embodiments, portable computing device 150 may represent a server computing system utilizing multiple computers as a server system, such as in a cloud computing environment. In general, portable computing device 150 is representative of any electronic device or combination of electronic devices capable of executing machine readable program instructions as described in greater detail with regard to FIG. 8, in accordance with embodiments of the present invention. Portable computing device 150 contains preemption directional indicators 152 and an instance of directional preemption notification program 200.

Preemption directional indicators 142 and 152 present information to a user of vehicle computing device 140 and/or portable computing device 150 to indicate the number if priority vehicles with an associated direction of approach. In one embodiment, preemption directional indicators 142 and 152 include visual notifications such as lights, graphics symbols, and/or text. Example embodiments of preemption directional indicators 142 and 152 are depicted and described in greater details in FIG. 4A, FIG. 4B, FIG. 4C, FIG. 4D, and FIG. 4E. In another embodiment, preemption directional indicators 142 are video displays (e.g., video screen of the information system, dash displays, embedded display within the rear view mirror, etc.) that playback camera data captured by vehicle cameras in real time, thereby showing the approaching priority vehicle to the driver from the perspective of the capturing camera. In some embodiments, preemption directional indicators 142 include a label with in the video display that identify the capturing camera to provide additional orientation/directional information. For example, a backup camera indicates rear view on the video display, which the driver interprets to mean the approaching priority vehicle comes from behind. In another embodiment, preemption directional indicators 142 add additional symbols to the side view mirrors to indicate the approach of a priority vehicle. For example a priority vehicle approaching from the right initiates display of preemption directional indicators 142 on the passenger side view mirror, whereas a priority vehicle approaching from the left initiates display of preemption directional indicators 142 on the driver's side view mirror.

In another embodiment, preemption directional indicators 142 and 152 include audio alerts (e.g., sounds to alert a user of a condition and/or incoming notification) and/or voice notifications that state directional information associated with one or more priority vehicles that directional preemption notification program 200 provides to the user through speakers within the vehicle and/or portable computing device 150. For example, an audio/information system within the vehicle ceases, mutes, and/or lowers the volume of the radio, and the audio/information system states "Emergency vehicle approaches from the driver's left had side at the intersection." In some other embodiment, preemption directional indicators 142 and 152 include a combination of the aforementioned embodiments (i.e., audio and visual notifications). Preemption directional indicators 142 and 152 receive information from directional preemption notification program 200 and provide visual and/or audio notifications to a user of vehicle computing device 140 or portable computing device 150.

In another embodiment, preemption directional indicators 142 and 152 include tactile notifications. The tactile notifications incorporate a vibrational element into vehicle computing device 140 and/or portable computing device 150 that are felt by a driver and/or by the individual holding a hand held portable device. For example, the steering wheel of a vehicle includes two vibrational elements, one for the left side, and one for the right side. The right side of the steering wheel vibrates when a priority vehicle approaches from the right. The left side of the steering wheel vibrates when a priority vehicle approaches from the left. And both the left and right side of the steering wheel vibrate together and/or in a pattern (e.g., alternating left and right) when the priority vehicle approaches from the front and/or rear.

Preemptive traffic system 120 may be a management server, a web server, or any other electronic device or computing system capable of receiving and sending data. In some embodiments, preemptive traffic system 120 may be a laptop computer, a tablet computer, a netbook computer, a personal computer (PC), a desktop computer, a personal digital assistant (PDA), a smart phone, or any programmable device capable of communication with traffic signal device 110, vehicle computing device 140, and/or portable computing device 150, over network 130. In other embodiments, preemptive traffic system 120 may represent a server computing system utilizing multiple computers as a server system, such as in a cloud computing environment. In one embodiment, preemptive traffic system 120 operates from a remote fixed location (e.g., fire station, a 9-1-1 dispatcher, police dispatcher, a railroad centralized control station, railroad switching station, etc.) that is not located at the site of traffic signal device 110, and remotely controls one or more instances of traffic signal device 110, vehicle computing device 140, and/or portable computing device 150 at one or more separate locations.

For example, an emergency situation occurs at a house on the north side of town. A central call center notifies an ambulance and a fire trucks that dispatch from a first location (e.g., fire station) on the west side of town and police vehicles that dispatch from a second separate location on the south east side of town (e.g., mobile location, police station). As the first and second locations are different, the ambulance and fire trucks encounter different instances of: traffic signal device 110, vehicle computing device 140, and/or portable computing device 150, than the police vehicles. Preemptive traffic system 120 thus controls multiple instances of traffic signal device 110, vehicle computing device 140, and/or portable computing device 150 along the two separate travel routes to the house for the ambulance, fire trucks, and police vehicles.

In another embodiment, preemptive traffic system 120 is installed with and operates directly from traffic signal device 110 at individual intersections (e.g., intersection includes acoustic sensors for detection of a specific pattern of tweets or wails from the siren of an emergency vehicle) and controls the individual instances of traffic signal device 110, and instances of vehicle computing device 140, and/or portable computing device 150 within a specified range of the individual intersections. In some other embodiment, preemptive traffic system 120 operates from a moving location (e.g., installed within a moving vehicle), and triggers: traffic signal device 110, vehicle computing device 140, and/or portable computing device 150 upon approach (i.e. within a specified range and or distance of an intersection and/or vehicle). In yet some other embodiment, the aforementioned embodiments of preemptive traffic system 120 operate in conjunction with a Global Positioning System (GPS) that determines a location of the activating vehicle, a direction in which the vehicle is heading, identifies which traffic lights to preempt, and activates the identified traffic lights. In yet another embodiment, one or more of the aforementioned embodiments of preemptive traffic system 120 may occur in combination. Preemptive traffic system 120 contains preemption notification 122.

Preemption notification 122 is information that preemptive traffic system 120 provides to directional preemption notification program 200, which identifies an approaching (e.g., incoming) priority vehicle for notification to drivers and/or pedestrians via a traffic signal, vehicle computing device 140, and/or portable computing device 150 with an associated direction. In one embodiment, preemption notification 122 is a sound and or series of sounds created by a priority vehicle (e.g., siren of an emergency vehicle, train whistle, etc.), in which a direction finding device determines a bearing associated with the audio sounds. In another embodiment, preemption notification 122 is visual information in the form of viewable lights installed on a priority vehicle (e.g., fire truck, police car, ambulance) that are turned on. For example, an approaching police vehicle turns on emergency lights within the lighting bar attached to the top of the police vehicle, which flashes red, white and blue in rapid succession. The flashing sequence of lights of the police vehicle indicate to an individual (e.g., driver, pedestrian, etc.) upon viewing, to move to the side and clear the path for the police vehicle to proceed unhindered (i.e., right of way). In some other embodiment, preemption notification 122 is message request sent from preemptive traffic system 120 (e.g., line of sight, radio based, etc.) as an equipped vehicle approaches an intersection and/or a second non-equipped vehicle in which a direction finding device determines a bearing to the source. In yet some other embodiment, preemption notification 122 is information sent from a GPS that includes a location or the activating vehicle, a direction in which the activating vehicle is heading (i.e., identifies direction of approach), and identifies instances of traffic signal device 110 to preempt.

Directional preemption notification program 200 is a program for determining the number of priority vehicles with associated directions of approach and notifying pedestrians and/or drivers of vehicles. In FIG. 1, direction preemption notification program 200 is depicted as: directional preemption notification program 200A on traffic signal device 110, directional preemption notification program 200B on vehicle computing device 140, and directional preemption notification program 200C on portable computing device 110, however directional preemption notification program 200A, B, and C are the same program that are installed on different devices, and for simplicity are referred to as directional preemption notification program 200. In another embodiment, directional preemption notification program 200 determines the number of priority vehicles with associated directions of approach for driverless vehicles, from which the driverless vehicle determines further appropriate actions (e.g., pull over to provide the right of way, etc.). In the depicted embodiment, an instance of directional preemption notification program 200 is installed within traffic signal device 110, vehicle computing device 140, and portable computing device 150. While installed on different devices, directional preemption notification program 200A, B, and C are the same and operate similarly, although the separate instances of directional preemption notification program 200A, B, and C may exercise different functions (e.g., capabilities) that are consistent with the capabilities available to the installation location. For example, traffic signal device 110 includes only preemption directional light indicators 112, and provides only visual cues. However, vehicle computing device 140 and portable computing device 150 include preemption directional indicators 142 and 152 that include visual and/or audio cues (e.g., lights, images, text, and sound). Directional preemption notification program 200 receives preemption notification 122 from preemptive traffic system 120. Upon processing preemption notification 122, directional preemption notification program 200 controls and initiates preemption directional light indicators 112, preemption directional indicators 142, and/or preemption directional indicators 152 accordingly.

Network 130 may be a local area network (LAN), a wide area network (WAN) such as the Internet, a wireless local area network (WLAN), any combination thereof, or any combination of connections and protocols that will support communications between traffic signal device 110, preemptive traffic system 120, vehicle computing device 140, portable computing device 150, and other computing devices and servers (not shown), in accordance with embodiments of the inventions. Network 130 may include wired, wireless, or fiber optic connections.

Figure 3A:
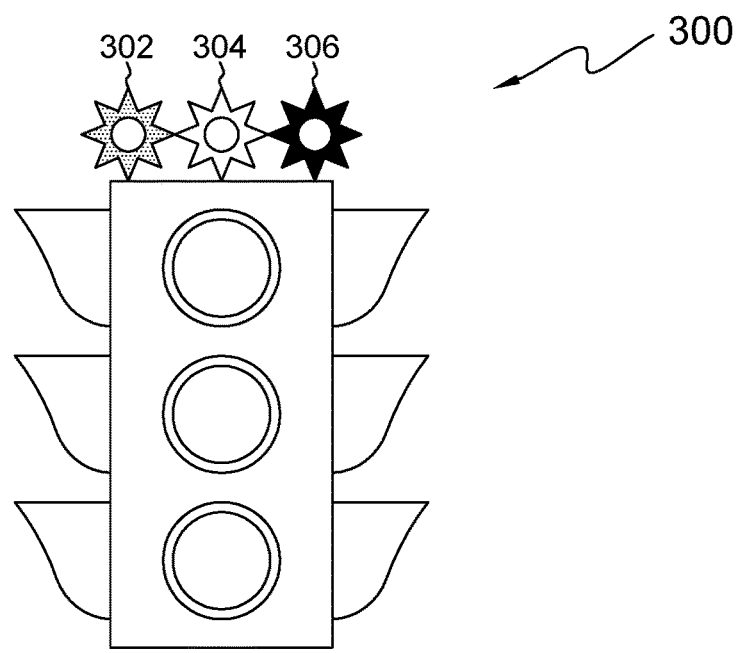
FIG. 3A depicts a traffic signal device with additional preemption directional light indicators, installed on the traffic signal in a straight line, top mounted configuration, in accordance with an embodiment of the present invention.

FIG. 3A depicts an example embodiment of the present invention that controls traffic signal device 300 and initially adds left directional light indicator 302, forward and/or rear directional light indicator 304, and right directional indicator 306 (e.g., preemption directional light indicators 112) in a straight line orientation. In one embodiment, left directional light indicator 302 is a yellow light, forward and/or rear directional light indicator 304 is a white light, and right directional indicator 306 is an orange light. In another embodiment, left directional light indicator 302, forward and/or rear directional light indicator 304, and right directional indicator 306 may be any color light and/or strobe light based on a standard selected to represent a direction and number of priority vehicle approaching traffic signal device 300. In another embodiment, directional preemption notification program 200 initiates a flashing sequence to indicate the direction of approach and the number of priority vehicles. For example, directional preemption notification program 200 flashes left directional indicator 302 three times in rapid succession, then turns off left directional indicator 302 for one second prior to repeating, thereby indicating three priority vehicles approach from the left (i.e., three priority vehicles approach from the same direction).

Figure 3B:
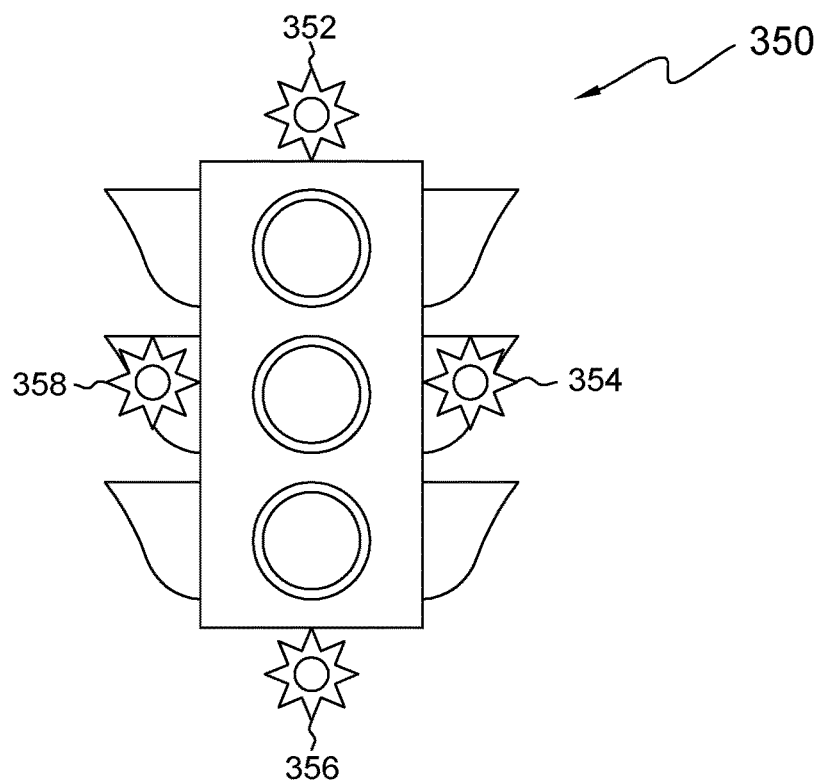
FIG. 3B depicts a traffic signal device with additional preemption directional light indicators, installed on the traffic signal in an orientation configuration, in accordance with an embodiment of the present invention.

FIG. 3B depicts an example embodiment of the present invention that controls traffic signal device 350 and initially adds front directional light indicator 352, right directional light indicator 354, rear directional light indicator 356, and left directional light indicator 358 (e.g., represent preemption directional light indicators 112) in a compass orientation. The compass orientation shows direction relative to geographic cardinal directions (e.g., north, east, south, and west) and/or to a set of defined points (e.g., front, right, rear, and left) that represent a direction with respect to the orientation of traffic signal device 350 that is viewable by pedestrians and/or drivers of vehicles. Directional preemption notification program 200 conveys the direction of approach and number of approaching priority vehicles via traffic signal device 350 by initiating varying combinations of front directional light indicator 352, right directional light indicator 354, rear directional light indicator 356, and left directional light indicator 358. In one embodiment, directional preemption notification program 200 initiates a steady light, to indicate the number of approaching priority vehicles with a direction. For example, two priority vehicles approach one from the east (e.g., right direction) and the second form the west (e.g., left direction). Directional preemption notification program 200 turns on right directional light indicator 354 and left directional light indicator 358 as a steady light thereby indicating the approach of one priority vehicle from the right and a second priority vehicle from the left (i.e., two total but from different directions). In another embodiment, directional preemption notification program 200 initiates a flashing sequence to indicate the direction of approach and the number of priority vehicles.

Figure 4A:
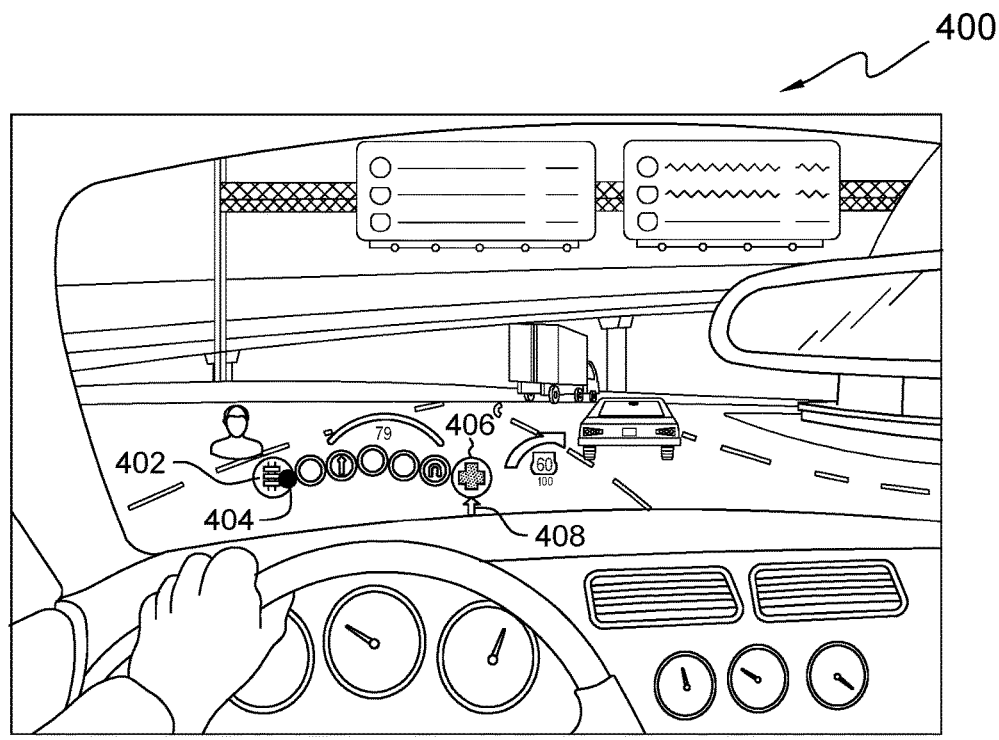
FIG. 4A depicts directional and emergency vehicle and train/light rail transit preemption directional indicators, displayed through a heads up display of a vehicle, in accordance with an embodiment of the present invention.

FIG. 4A depicts an example embodiment of the present invention within heads-up display 400 that adds train/light rail transit indicator 402, with directional indicator 404, and emergency vehicle indicator 406 with directional indicator 408 (e.g., preemption directional indicators 142 and 152). When active, directional preemption notification program 200 illuminates train/light rail transit indicator 402 with directional indicator 404 and/or emergency vehicle indicator 406 with directional indicator 408. In one embodiment, directional indicator 404 includes symbols (e.g., location dot, directional arrow, a letter, etc.) to indicate the direction of approach. In another embodiment, train/light rail transit indicator 402 and/or emergency vehicle indicator 406 include different colors that represent a different direction of approach that replaces directional indicators 404 and/or 408. For example, blue represents north/forward, green represents east/right, red represents south/rear, and white represents west/left.

Figure 4B:
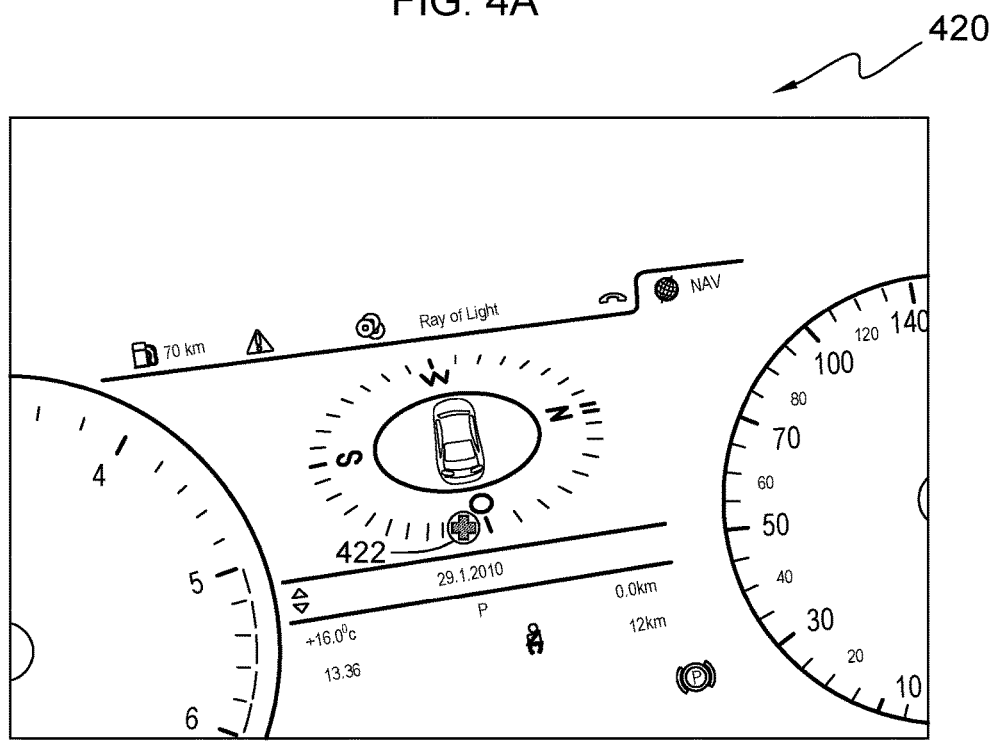
FIG. 4B depicts directional emergency vehicle and train/light rail transit preemption directional indicator with respect to a vehicle representation within an internal console of a vehicle, in accordance with an embodiment of the present invention.

FIG. 4B depicts an example embodiment of the present invention within vehicle representation 420 and adds directional indicator 422 (preemption directional indicators 142). Directional indicator 422 as depicted represents an emergency vehicle, however in an alternate embodiment, directional indicator 422 represents a symbol associated with a railroad crossing and/or light rail transit. Directional preemption notification program 200 determines the type of priority vehicle based on information within preemption notification 122. Directional preemption notification program 200 illuminates the instance of directional indicator 422 associated with the type of approaching priority vehicle with respect to the vehicle representation 420, which mirrors the actual position of a vehicle on a road. As depicted in the example, directional indicator 422 approaches from behind vehicle representation 420, and is behind the actual vehicle.

Figure 4C:
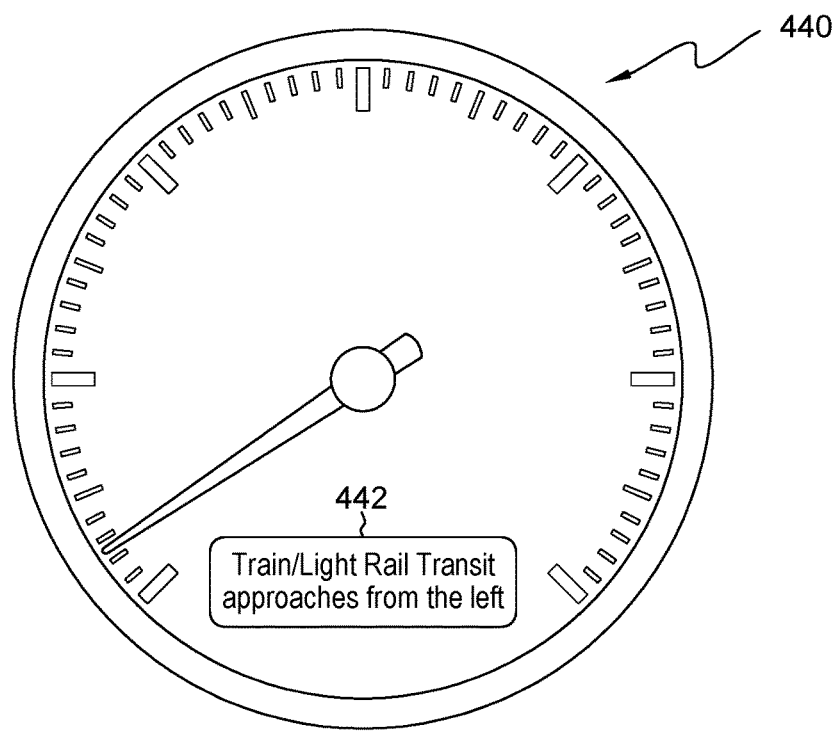
FIG. 4C depicts a text notification of a preemption directional indicator within an indicator gauge of a vehicle, in accordance with an embodiment of the present invention.

FIG. 4C depicts an example embodiment of the present invention within dashboard gauge 440 that adds informational text message 442 (e.g., preemption directional indicators 142). In one embodiment, directional preemption notification program 200 displays a single instance of informational text message 442. In another embodiment, directional preemption notification program 200 displays multiple instances of informational text message 442, in which directional preemption notification program 200 cycles the multiple instances of informational text message 442 to notify a driver of multiple approaching priority vehicles. For example, directional preemption notification program 200 displays a first instance of informational text message 442 that states "Train/Light Rail transit approaches from the left," for five seconds. After five seconds, directional preemption notification program 200 displays a second instance of informational text message 442 that states "Emergency vehicle approaches from behind," and then repeats. In some other embodiment, directional preemption notification program 200 displays a single instance of informational text message 442 that combines the multiple instances of informational text message 442 to convey the relevant information by shortening and/or abbreviating the multiple instances of informational text message 442. For example, a combination of the first and second instances of informational text message 442 becomes "Train approaches left, Emergency approaches behind."

Figure 4D:
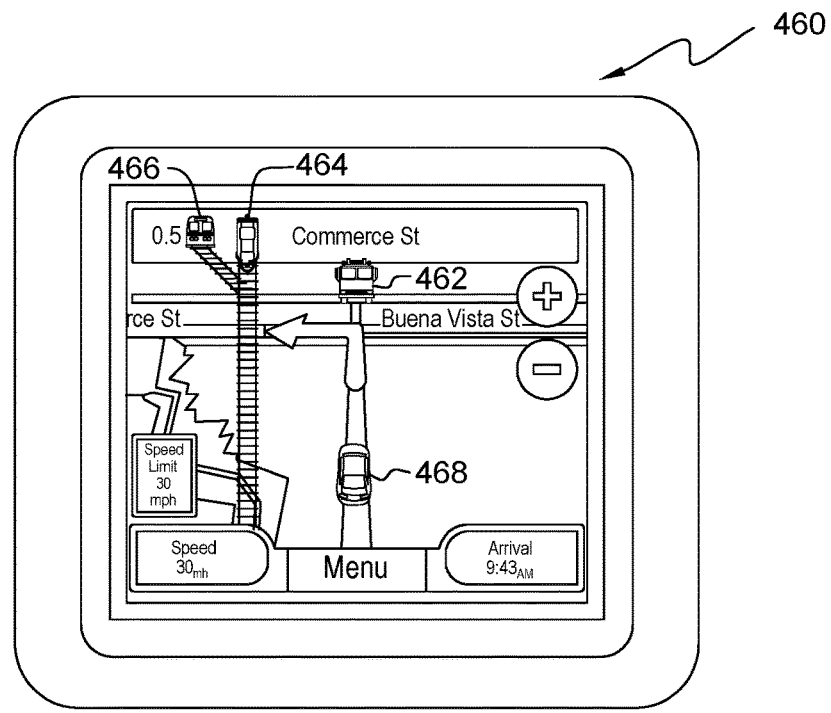
FIG. 4D depicts a global position navigation system displaying a map that identifies the locations and directional emergency vehicle, train, and light rail transit preemption directional indicators with respect to the vehicle for the user, in accordance with an embodiment of the present invention.

FIG. 4D depicts an example embodiment of the present invention that controls aspects of GPS navigation display 460 and adds emergency icon 462, train icon 464, and light rail transit icon 466, and vehicle icon 468 (e.g., preemption directional indicators 142 and/or preemption directional indicators 152). In the depicted embodiment, directional preemption notification program 200 displays the location of emergency icon 462, train icon 464, and light rail transit icon 466 along the GPS navigation route with respect to the position of vehicle icon 468. Directional preemption notification program 200 displays advance warnings of upcoming additional priority vehicles to the driver that will be encountered while en route to a destination. For example, emergency icon 462 depicts a fire truck heading towards vehicle icon 468, which causes the driver to pause at the intersection to allow the fire truck to pass. The driver then turns left on Buena Vista Street, and encounters a train shown as train icon 464, that is to the right of vehicle icon 468. After stopping for the train represented by vehicle icon 468, the driver proceeds and turns right and encounters a light rail transit as depicted by light rail transit icon 466 that is to the left of vehicle icon 468.

Figure 4E:
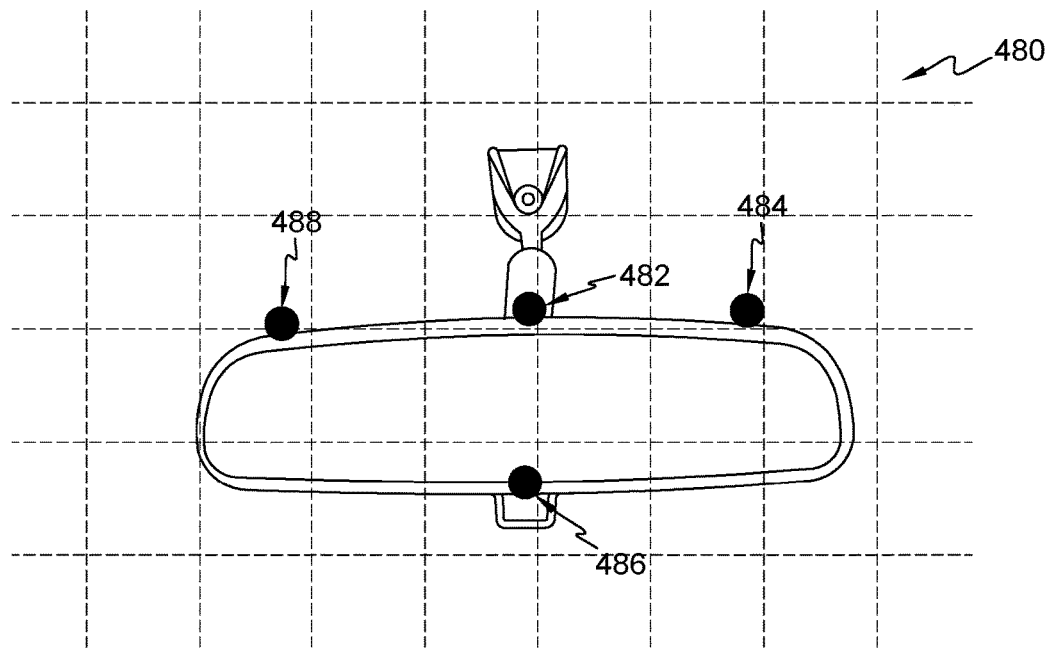
FIG. 4E depicts preemption directional indicators installed on a rear view mirror of a vehicle, in accordance with an embodiment of the present invention.

FIG. 4E depicts an example embodiment of the present invention that controls preemption directional indicators 142 and/or preemption directional indicators 152 that are added to rear view mirror light indicators 480 as front directional light indicator 482, right directional light indicator 484, rear directional light indicator 486, and left directional light indicator 488. Directional preemption notification program 200 conveys the direction of approach and number of approaching priority vehicles via rear view mirror light indicators 480 by initiating varying combinations of front directional light indicator 482, right directional light indicator 484, rear directional light indicator 486, and left directional light indicator 488. In one embodiment, directional preemption notification program 200 initiates a steady light, to indicate single approaching priority vehicle from a direction. In another embodiment, directional preemption notification program 200 initiates a flashing sequence to indicate the direction of approach and the number of priority vehicles.

Figure 5:
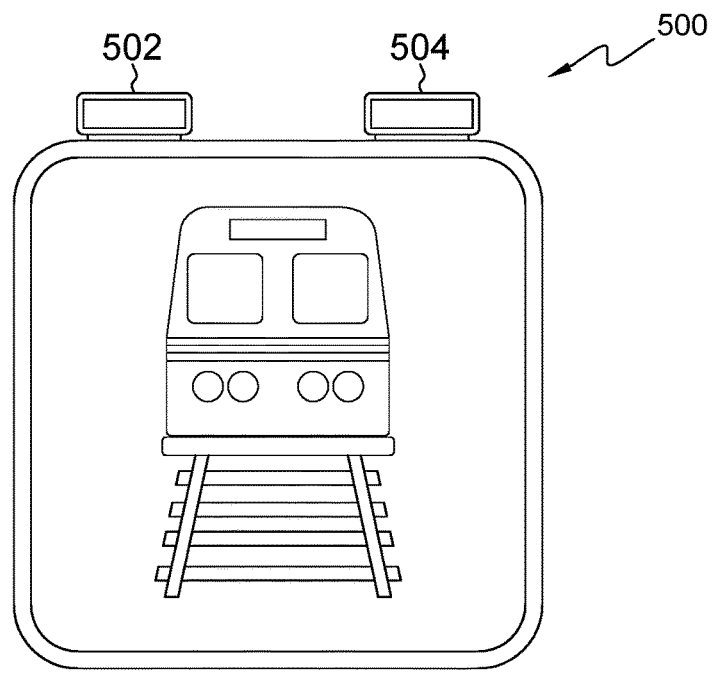
FIG. 5 depicts a light rail transit signal with additional preemption directional light indicators, in accordance with an embodiment of the present invention.

FIG. 5 depicts an example embodiment of the present invention within light rail transit signal 500 that adds and controls preemption directional light indicators 112 as represented by left directional indicator 502 and right directional indicator 504. As light rail transit tracks intersect with roads in a perpendicular manner, the direction of approach with regards to the perspective of an engineer of the light rail transit, drivers of vehicles, and/or pedestrians occurs in a left and right manner, in an embodiment light rail transit signal 500 may only include left directional indicator 502 and right directional indicator 504. In an embodiment for light rail transit engineers with one approaching priority vehicle and/or vehicle crossings and/or pedestrian crossings with one set of tracks, directional preemption notification program 200 initiates left directional indicator 502 or right directional indicator 504 to display a steady color as only one light rail transit can approach on a single set of tracks. In another embodiment, directional preemption notification program 200 initiates left directional indicator 502 or right directional indicator 504 to flash at a specified rate. For example, a steady flashing sequence in which the length of the on time is equal to the off time (e.g., one second on with one second off), indicates a single vehicle approaches. In some other embodiment in which the engineer of the light rail transit approaches an intersection with multiple approaching priority vehicles and/or in which vehicles and/or pedestrians crossings are associated with multiple set of tracks, directional preemption notification program 200 initiates left directional indicator 502 and/or right directional indicator 504 to flash a sequence that repeats to identify the direction of approach and the number of priority vehicles approaching. For example, a flashing sequence that includes two flashes on within one second, followed by two seconds off prior to repeating would indicate the approach of two priority vehicles from the same direction. In some other embodiment, directional preemption notification program 200 initiates a flashing sequence that alternates between left directional indicator 502 and right directional indicator 504, which indicates two priority vehicles and/or light rail transits approach, but from both directions (i.e., opposite directions, from both left and right).

Figure 6:
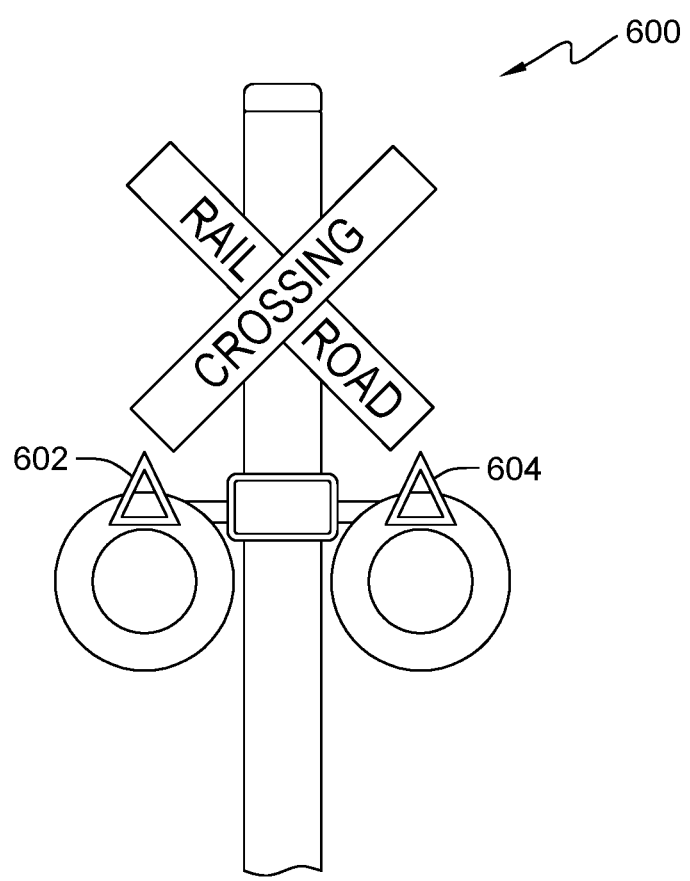
FIG. 6 depicts a rail road crossing signal with additional preemption directional light indicators, in accordance with an embodiment of the present invention.

FIG. 6 depicts an example embodiment of the present invention with respect to railroad crossing signal 600 that adds and controls left directional indicator 602 and right directional indicator 604 as preemption directional light indicators 112. As railroad tracks intersect with roads in a perpendicular manner, the direction of approach with regards to the perspective of an engineer of a train, drivers of vehicles, and/or pedestrians occurs in a left and right manner in some embodiments, railroad crossing signal 600 therefore may only include left directional indicator 602 and right directional indicator 604. In an embodiment for train engineers with one approaching priority vehicle and/or vehicle crossings and/or pedestrian crossings with one set of tracks, directional preemption notification program 200 initiates left directional indicator 602 or right directional indicator 604 to display a steady color as only one train can approach on a single set of tracks. In another embodiment, directional preemption notification program 200 initiates left directional indicator 602 or right directional indicator 604 to flash at a specified rate. For example, a steady flashing sequence in which the length of the on time is equal to the off time (e.g., one second on with one second off), indicates a single vehicle approaches. In another embodiment for the engineer of the train approaching an intersection with multiple approaching priority vehicles and/or in which vehicles and/or pedestrians crossings are associated with crossing multiple set of tracks, directional preemption notification program 200 initiates a flashing sequence that repeats to identify the direction of approach and the number of priority vehicles approaching. In another embodiment, directional preemption notification program 200 initiates a flashing sequence that includes two flashes on within one second followed by two seconds off would indicate the approach of two priority vehicles from the same direction. In some other embodiment, directional preemption notification program 200 initiates a flashing sequence that alternates between left directional indicator 602 and right directional indicator 604, which indicates two priority vehicles and/or light rail transits approach, but from both directions (i.e., opposite directions, from both left and right).

Figure 2:
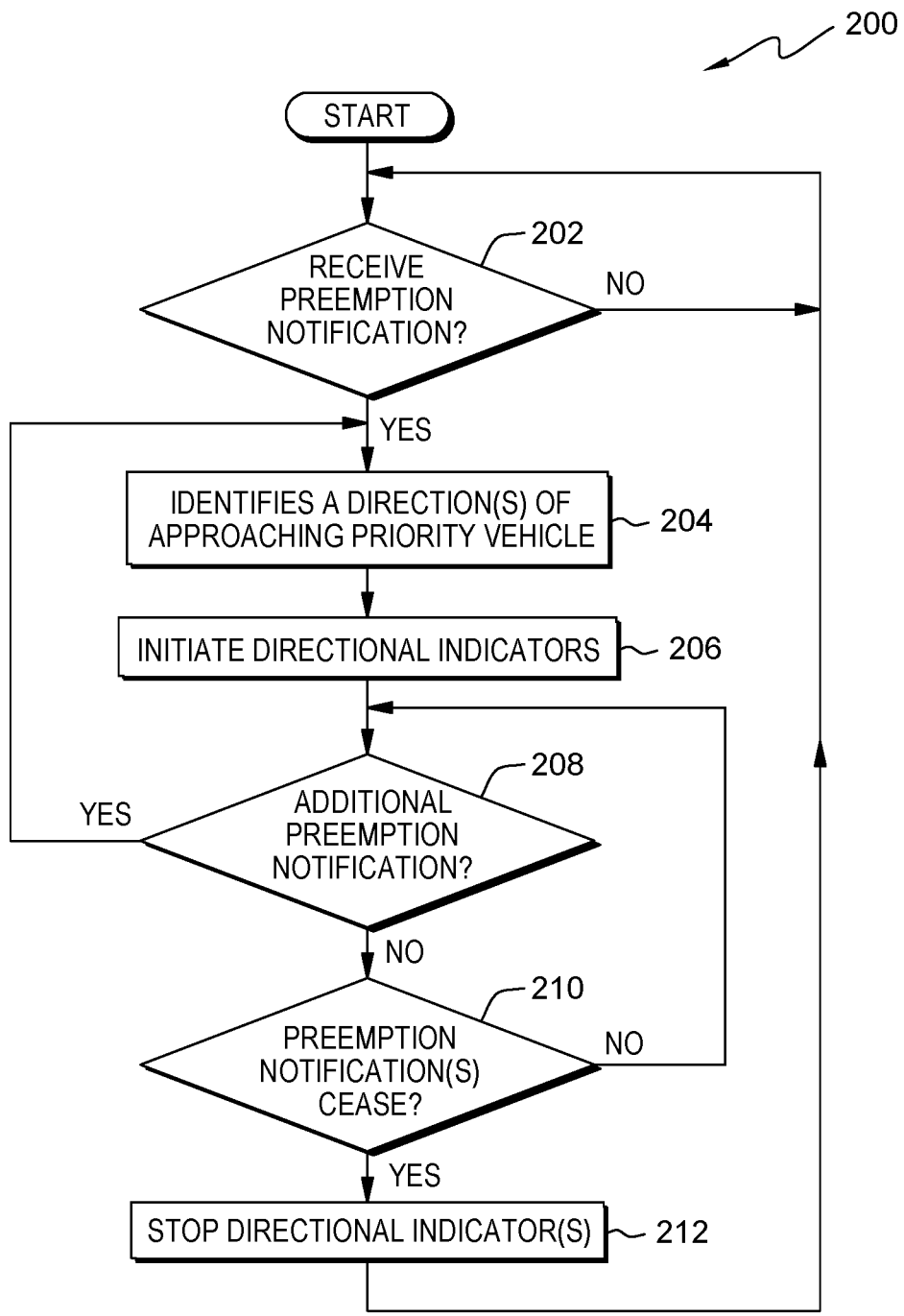
FIG. 2 is a flowchart depicting operational steps of a directional preemption notification program, on a computing device within the traffic preemption processing environment of FIG. 1, for notifying drivers and/or pedestrians of one or more approaching priority vehicles with an associated direction, in accordance with an embodiment of the present invention.

FIG. 2 is a flowchart depicting operational steps of directional preemption notification program 200 a program for notifying drivers and/or pedestrians of one or more approaching priority vehicles with an associated direction, in accordance with an embodiment of the present invention. Directional preemption notification program 200 is active (i.e., initiates) at any intersection (street, railroad crossing, light rail transit crossing) with traffic signal device 110 and/or at any location that includes vehicle computing device 140 and/or portable computing device 150 and is turned on. While directional preemption notification program 200 is active at all times upon application of power, directional preemption notification program 200 does not perform additional operational steps until directional preemption notification program 200 receives preemption notification 122 (e.g., identifies the approach of an emergency vehicle, train, and/or light rail transit).

In decision 202, directional preemption notification program 200 determines whether directional preemption notification program 200 receives preemption notification 122. In one embodiment, directional preemption notification program 200 receives preemption notification 122 from a remote location of preemptive traffic system 120 (e.g., a dispatch center, train station, etc.) via network 130. For example, a 9-1-1 operator receives a call for assistance. The 9-1-1 operator initiates a sequence of events through preemptive traffic system 120 that dispatches emergency vehicles to the location requesting assistance and sends preemption notification 122 to instances of directional preemption notification program 200 that share the route on which travel is to take place (i.e., sends preemption notification 122 to instances of directional preemption notification program 200 associated with traffic signal devices 110, vehicle computing device 140, and/or portable computing devices 150 and that intersect and/or follow the same path as the emergency vehicles as identified by a GPS navigation system). In another embodiment, directional preemption notification program 200 receives preemption notification 122 from a positive train control system. A positive train control system is a system for monitoring and controlling train movements that includes information pertaining to the location of a train through an onboard GPS navigation system.

In another embodiment, directional preemption notification program 200 receives preemption notification 122 directly from approaching emergency vehicles over network 130 and/or as a detected signal (e.g., audio sounds, visual cues, message request from a mobile instance of preemptive traffic system 120 installed within the emergency/priority vehicle, etc.) at an intersection and/or vehicle that is within range in which the received signal meets and/or exceeds a minimum level (e.g., signal increases in strength over time as the signal approaches the intersection), signal meets a minimum detection threshold, etc. For example, an ambulance includes an instance of preemptive traffic system 120. Upon turning on the lights and/or sirens of the ambulance, the driver continuously sends preemption notification 122 via the visible lights and audible siren, until the ambulance driver turns the lights and/or sirens off. The range (e.g., area of coverage) of preemption notification 122 is the distance and/or area over which detection of preemption notification 122 is possible. The range is dependent on the strength of preemption notification 122, sensitivity of receivers within traffic signal devices 110, vehicle computing device 140, and/or portable computing devices 150, and physical obstructions and/or radio interference in the surrounding area. In another example, an emergency vehicle approaches an intersection without sirens and/or lights turned on as identified by the emergency vehicle response protocol for the request for assistance. However, the emergency vehicle sends an instance of preemption notification 122 from an onboard instance of preemptive traffic system 120 to notify additional vehicles and/or pedestrians of the approach of the emergency vehicle through traffic signal devices 110, vehicle computing device 140, and/or portable computing devices 150. Additionally, in some embodiments, the driver of the emergency vehicle may selectively and/or automatically send additional instances and/or formats (e.g., remote message or signal requesting a change of a traffic light) of preemption notification 122 to instances of traffic signal devices 110, vehicle computing device 140, and/or portable computing devices 150 that are within range of the ambulance.

Figure 7:
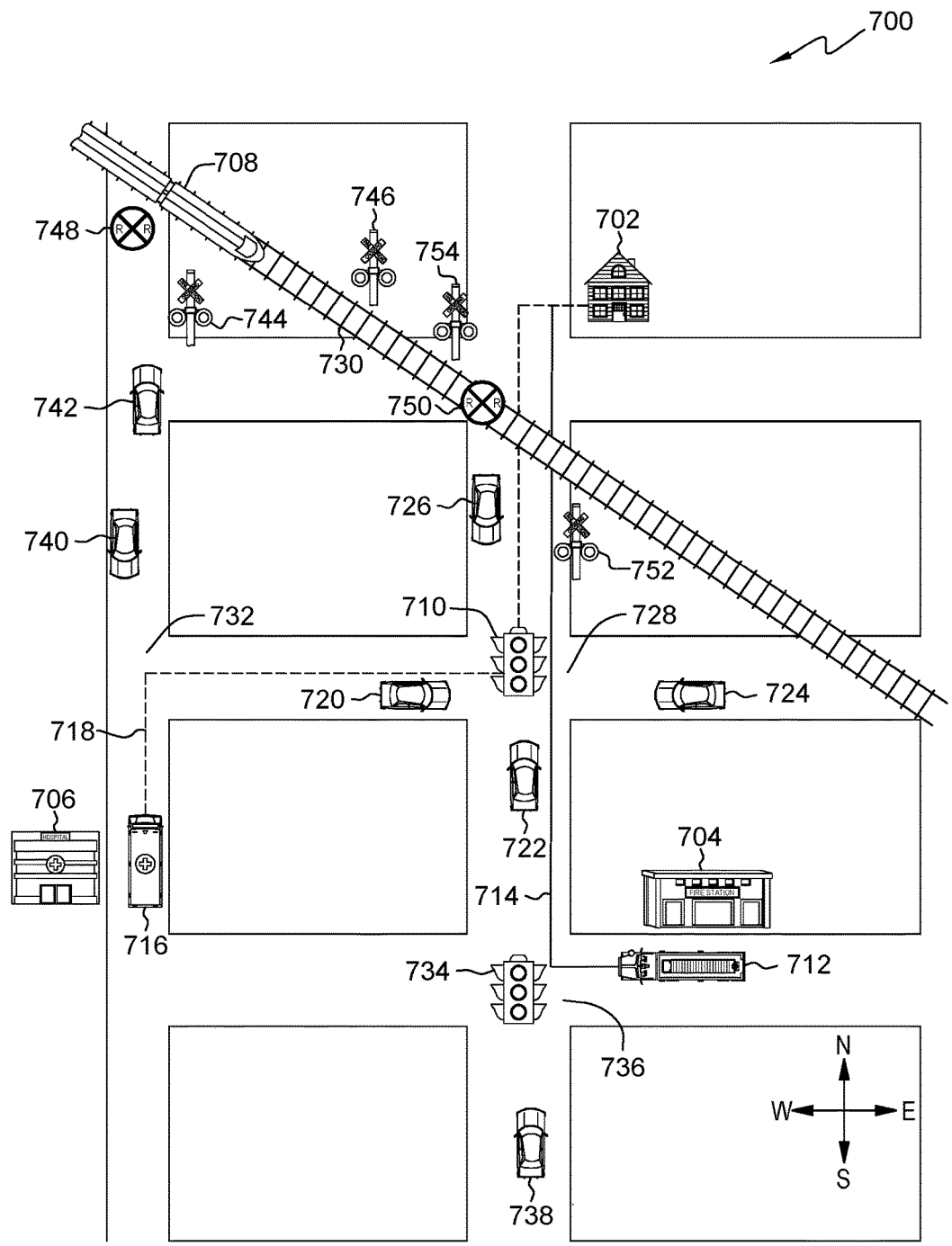
FIG. 7 depicts an approaching priority vehicle environment for a scenario to identify direction of approach for single and multiple instances of approaching priority vehicles, in accordance with an embodiment of the present invention.

For example FIG. 7 depicts approaching priority vehicle environment 700, ambulance 716 approaches intersection 732, which does not include a traffic signal device, via route 718. Ambulance 716 sends preemption notification 122 via preemptive traffic system 120, to the surrounding area (e.g., one block and/or multiple block radiuses) as ambulance 716 approaches intersection 732. Vehicle 740 also approaches intersection 732 moving south, and is within range of ambulance 716. An instance of directional preemption notification program 200 within vehicle 740 receives preemption notification 122 from ambulance 716.

In some other embodiment, directional preemption notification program 200 receives preemption notification 122 through the processing of camera data from streaming video provided by traffic cameras installed at traffic signal device 110 and/or onboard cameras installed in a vehicle (e.g., backup cameras, front view camera, side view cameras, 360 degree cameras, dash camera, etc.). Directional preemption notification program 200 utilizes a combination of object recognition (i.e., identifies objects within an image based on learned objects or object classes), identification (i.e. individual recognition of a specific object), and/or detection (i.e., scans the camera data for a specific condition to occur) to identify preemption notification 122 (e.g., approaching emergency vehicle, train, and/or light rail transit). For example, a police vehicle turns onto a street behind a car equipped with backup cameras, but the lights and sirens are not in use. Directional preemption notification program 200 identifies the police car within the camera data based on object recognition. Directional preemption notification program 200 performs identification by identifying the color pattern on the vehicle (e.g., black with white, navy blue with yellow) and writing on the car (e.g., police, sheriff, state trooper, etc.). Directional preemption notification program 200 scans the camera data for flashing lights associated with the police car to determine receipt of preemption notification 122 (e.g., detection of a specific event). As the lights are not flashing, directional preemption notification program 200 determines an emergency event is not taking place, and therefore, directional preemption notification program 200 does not receive preemption notification 122. Directional preemption notification program 200 treats the police car similarly to a non-emergency vehicle while the lights are not flashing. However, as directional preemption notification program 200 continues to process the camera data, if the lights of the police vehicle are turned on at any point while within the camera data, directional preemption notification program 200 determines receipt of preemption notification 122 occurs. In some other embodiments, directional preemption notification program 200 utilizes one or more of the aforementioned embodiments to determine whether receipt of preemption notification 122 occurs. Directional preemption notification program 200 stores and tracks individual instances of preemption notification 122 for further use.

If directional preemption notification program 200 determines receipt of preemption notification 122 occurs (decision 202, yes branch), then directional preemption notification program 200 identifies a direction(s) of approaching emergency vehicle (Step 204). If directional preemption notification program 200 determines receipt of preemption notification 122 does not occur (decision 202, no branch), then directional preemption notification program 200 returns and determines whether directional preemption notification program 200 receives preemption notification 122 (i.e., directional preemption notification program 200 waits to initiate until preemption notification 122 occurs).

In step 204, directional preemption notification program 200 identifies a direction(s) of an approaching priority vehicle. Directional preemption notification program 200 identifies a direction of approach with respect to the orientation/position of traffic signal device 110, vehicle computing device 140, and/or portable computing device 150 relative to the approaching priority vehicle. In one embodiment, directional preemption notification program 200 determines a single direction of approach associated with a single instance of preemption notification 122. For example within a car, the direction of approach is only conveyed to the driver of the car via vehicle computing device 140, and therefore directional preemption notification program 200 provides a single perspective as to the direction of approach. In another embodiment, directional preemption notification program 200 determines multiple directions of approach for a single instance of preemption notification 122. For example, an instance of traffic signal device 110 controls four directions. As traffic signal device controls pedestrian and vehicle traffic in four separate directions, the orientation of the vehicles and/or pedestrians to the intersection alters the perception of the direction of approach of the priority vehicle. Therefore, directional preemption notification program 200 identifies a direction of approach of the emergency vehicle with respect to each of the four directions of the intersection.

In one embodiment, directional preemption notification program 200 identifies a direction of approached based on received directional information from GPS information sent within preemption notification 122. Directional preemption notification program 200 utilizes the planned GPS navigation route and the starting location from preemption notification 122 to determine a direction of approach along the GPS navigation route. Directional preemption notification program 200 determines the direction of approach for each intersection along the planned GPS navigation route based on the known direction of turns (e.g., left, right) along the route as provided by the GPS navigation route. In another embodiment, directional preemption notification program 200 receives initial directional information from GPS information sent within preemption notification 122 and additional updates from an onboard GPS navigation system within the emergency vehicle responding to the dispatch. Based on the information from the onboard GPS navigation system, directional preemption notification program 200 determines whether deviations to the planned GPS navigation route occur.

For example a road is closed that is not identified in the GPS navigation database and the driver of the emergency vehicle is unable to turn right, the driver therefore must detour to reach the destination. The driver continues straight and later turns right onto a different street than is identified in the current GPS navigation route, and thus selects an alternate route to the destination. If directional preemption notification program 200 determines a deviation occurs, directional preemption notification program 200 utilizes the new location of the emergency vehicle to determine a new navigation route, and changes to the direction of approach along the new navigation route.

In some other embodiment, directional preemption notification program 200 determines a direction of approach based upon direction finding. Direction finding is the measurement of the direction from which a received signal (e.g., preemption notification 122) is transmitted. Directional preemption notification program 200 receives preemption notification 122 through two or more receivers of which the distance (i.e., spacing) between the two or more receivers is known. Directional preemption notification program 200 receives two or more measurements through the two or more receivers, thereby providing the appearance that preemption notification 122 arrives from two different locations. Directional preemption notification program 200 utilizes triangulation (i.e., formation of triangles from known points to determine a location) in order to determine the direction of approach based on the received two or more measurements (e.g., calculates the direction of approach through triangulation).

For example an intersection with traffic signal device 110 includes four receivers: one forward, one right, one left, and one back in order to cover each direction. An emergency vehicle sounds the siren which traffic signal device 110 receives on the front, left and right receivers. The magnitude (e.g., signal strength) is greatest on the forward receiver, and both the left and right receivers detect the sirens with a similar magnitude. Through triangulation, directional preemption notification program 200 determines the siren is approaching in front of the forward receiver. Additionally directional preemption notification program 200 determines a distance that identifies how far the emergency vehicle is away from the intersection.

In yet some other embodiment, directional preemption notification program 200 determines the direction of approach through an instance of preemption notification 122 that includes camera data from streaming video provided by traffic cameras installed at traffic signal device 110 and/or onboard cameras installed in a vehicle. Directional preemption notification program 200 utilizes computer vision to process the camera data for approaching priority vehicles. Directional preemption notification program 200 interprets the results of the computer vision (i.e., object recognition, identification, and detection of a specific vehicle and condition) with the known positions of the cameras that provide the camera data, and configuration of the intersection to identify a direction of approach associated with preemption notification 122.

For example, at an intersection, cameras face out from the center of the intersection in each direction (e.g., a north facing camera, an east facing camera, a south facing camera, and a west facing camera. Within the camera data, directional preemption notification program 200 identifies a train approaching within the camera data from the east facing camera. Directional preemption notification program 200 utilizes the information from the camera data, the camera position associated with the detection of preemption notification 122 (e.g., object recognition of the engine car of a moving train) and the known configuration of the intersection stored in memory to determine the direction of the train, which directional preemption notification program 200 determines the direction to be proceeding towards the intersection from the west and is traveling east. In some other embodiments, directional preemption notification program 200 utilizes one or more of the aforementioned embodiments to identify a direction of an approaching emergency vehicle, train, and/or light rail transit.

Additionally, in some embodiments, directional preemption notification program 200 receives additional instances of preemption notification 122 (decision 208, yes branch) while a first instance of preemption notification 122 is active (i.e., receives multiple instances of preemption notification 122 concurrently, or while another instance of preemption notification 122 is occurring). Directional preemption notification program 200 identifies a direction associated with the additional instances of preemption notification 122 in the same manner as for a single instance of preemption notification 122 as described in the aforementioned embodiments. Directional preemption notification program 200 identifies locations within the GPS routes in which the additional instances of preemption notification 122 intersect and/or merge. Directional preemption notification program 200 stores and tracks each instance of preemption notification 122 separately (e.g., separate entry for each vehicle) in order to accurately notify drivers and/or pedestrians of the direction and approach of one or more priority vehicles.

For example, as depicted in FIG. 7, approaching priority vehicle environment 700, traffic signal 710 controls four-way intersection 728, and includes approaching vehicles, 720, 722, 724, and 726. A request for assistance occurs at house 702 on the north east side of town, and a dispatcher sends out fire truck 712 on route 714 from fire house 704 that is south and east of house 702 and ambulance 716 on route 718 from hospital 706 that is south and west of house 702. Directional preemption notification program 200 receives three separate instances of preemption notification 122 associated with train 708, fire truck 712, and ambulance 716. Directional preemption notification program 200 identifies a direction of approach for each of the three separate instances of preemption notification 122. Directional preemption notification program 200 identifies ambulance 716 approaches intersection 728 in a west to east direction, fire truck 712 approaches intersection 728 in a south to north direction, and light rail transit approaches intersection 728 in a northwest to southeast direction.

In step 206, directional preemption notification program 200 initiates preemption directional light indicators 112, preemption directional indicators 142, and/or preemption directional indicators 152. In one embodiment, directional preemption notification program 200 initiates preemption directional light indicators 112, preemption directional indicators 142, and/or preemption directional indicators 152 in response to a single instance of preemption notification 122 and an identified single direction of approach of the priority vehicle. For example, in FIG. 7, at intersection 736, vehicle 738 is heading north, but is south of traffic signal device 734 and fire truck 712 is heading west, but is east of traffic signal device 734. Traffic signal device 734 is shown in greater detail in FIG. 3A, traffic signal device 300, and includes left directional light indicator 302, forward and/or rear directional light indicator 304, and right directional indicator 306. With respect to the south facing side of traffic signal device 734 (i.e., the side of traffic signal device 734 viewed by a driver of vehicle 738), directional preemption notification program 200 initiates illumination of right directional indicator 306, thereby informing the driver of vehicle 738 that fire truck 712 approaches the intersection from the right.

In another example within FIG. 7, train 708 intersects (e.g., crosses) a street at railroad crossing 748. Prior to railroad crossing 748, train 708 sends preemption notification 122 to instances of directional preemption notification program 200 associated with railroad crossing signal 744 and vehicle 742. Railroad crossing 744 is depicted in greater detail in FIG. 6 and includes left directional indicator 602 and right directional indicator 604. Directional preemption notification program 200 determines train 708 approaches railroad crossing 748 moving from west to east, and identifies the direction of approach for railroad crossing signal 744 to be from the left. Directional preemption notification program 200 initiates illumination of left directional indicator 602 which is viewable and interpreted by the driver of vehicle 742 to mean train 708 approaches from the left. Additionally, vehicle 742 includes dashboard gauge 440 with informational text message 442, as depicted in greater detail in FIG. 4C. Directional preemption notification program 200 initiates informational text message 442, which states "Train/Light Rail Transit approaches from the left." In some other embodiment, rail road crossing signal 748 is replaced with a light rail transit signal as depicted in FIG. 5, light rail transit signal 500, which includes left directional indicator 502 and right directional indicator 504. For the same example, but with light rail transit signal 500, directional preemption notification program 200 initiates illumination of left directional light indicator 502.

In another embodiment, directional preemption notification program 200 initiates in response to multiple instances of preemption notification 122 and identifies multiple directions of approach for multiple approaching priority vehicles through preemption directional light indicators 112, preemption directional indicators 142, and/or preemption directional indicators 152. Directional preemption notification program 200 initiates instances of preemption directional light indicators 112, preemption directional indicators 142, and/or preemption directional indicators 152 that identifies the direction of approach with respect to the orientation of a pedestrian and/or vehicle.

Continuing the example in FIG. 7, at intersection 728 vehicle 720 travels east and is west of traffic signal 710, vehicle 722 travels north and is south of traffic signal 710, vehicle 724 travels west and is east of traffic signal 710, and vehicle 726 travels south and is north of traffic signal 710. Additionally fire truck 712 travels west and north along route 714 towards traffic signal 710, and ambulance 716 travels north and east along route 718 towards traffic signal 710 en route to house 702. Traffic signal 710 is shown in greater detail in FIG. 3B, traffic signal device 350, and includes front directional light indicator 352, right directional light indicator 354, rear directional light indicator 356, and left directional light indicator 358. With respect to the driver within vehicle 722 and/or pedestrians that view traffic signal 710, directional preemption notification program 200 initiates the illumination of left directional light indicator 358 and rear directional light indicator 356, thereby informing the driver of vehicle 722 and/or pedestrians that one emergency vehicle (e.g., fire truck 712) approaches intersection 728 from behind vehicle 722 (i.e. south of the intersection) and a second emergency vehicle (e.g., ambulance 716) approaches intersection 728 to the left of vehicle 722 (i.e., west of the intersection). For each remaining vehicle (e.g. vehicle 720, vehicle, 724, and vehicle 726), directional preemption notification program 200 initiates instances of front directional light indicator 352, right directional light indicator 354, rear directional light indicator 356, and left directional light indicator 358 that identify the direction of approach relative to the position of each vehicle and/or pedestrian that enters intersection 728. In other words, directional preemption notification program 200 initiates the illumination of: right directional light indicator 354 and rear directional light indicator 356 for vehicle 720, left directional light indicator 358 and front directional light indicator 352 for vehicle 724, and right directional indicator 354 and front directional light indicator 352 for vehicle 726.

Additionally, between intersection 728 and house 702, train 708 intersects a second street at railroad crossing 750, thereby intersecting with route 714 for fire truck 712, and route 718 for ambulance 718. Prior to railroad crossing 750, train tracks 730 include railroad crossing signal 746, which notifies the engineer of the train of approaching emergency vehicles. Railroad crossing signals 746, 752, and 754 are depicted in greater detail in FIG. 6 railroad crossing signal 600 and includes left directional indicator 602 and right directional indicator 604. An instance of directional preemption notification program 200 within railroad crossing signal 746 receives two instances of preemption notification 122. Directional preemption notification program 200 determines route 714 and route 718 merge and both fire truck 712 and ambulance 716 approach train tracks 730 from the right. Directional preemption notification program 200 initiates illumination of right directional indicator 604. The engineer of train 708 interprets right directional indicator 604 to mean an emergency vehicle approaches train tracks 730 from the right, and if possible, the engineer should stop train 708 to allow ambulance 716 and fire truck 712 to pass prior to proceeding. As train 708 may not be able to stop, an instance of preemptive traffic system 120 sends preemption notification 122 to instances of directional preemption notification program 200 installed at and/or associated with railroad crossing signal 752 and railroad crossing signal 754. Directional preemption notification program 200 identifies train 708 approaches railroad crossing 750 from the left with respect to vehicles and/or pedestrians traveling south and illuminates right directional indicator 604 on railroad crossing signal 754, and 200 identifies train 708 approaches railroad crossing 750 from the right with respect to vehicles and/or pedestrians traveling north and illuminates left directional indicator 602 on railroad crossing signal 752.

In decision 208, directional preemption notification program 200 determines whether an additional instance of preemption notification 122 occurs. Throughout the operational steps of directional preemption notification program 200, directional preemption notification program 200 continuously monitors for an instance and/or instances of preemption notification 122 to occur as described in decision 202. Directional preemption notification program stores and tracks received current instances of preemption notification 122 for comparison with additional instances of preemption notification 122 to determine whether an additional instance of preemption notification 122 occurs. A current instance of preemption notification 122 is an instance of preemption notification 122 that directional preemption notification program 200 previously received and processed, and for which directional preemption notification program 200 determines is still occurring (e.g., preemption notification 122 does not cease).

In one embodiment, directional preemption notification program 200 compares identifiers (e.g., operational signal frequency, embedded identifier, audio pattern, audio sounds, etc.) within preemption notification 122 to identifiers within current instances of preemption notification 122 to determine whether an additional instance of preemption notification 122 occurs. For example, directional preemption notification program 200 receives a first instance of preemption notification 122 that is a train whistle and directional preemption notification program 200 receives a second instance of preemption notification 122 that is an ambulance siren. Directional preemption notification program 200 determines the first instance of preemption notification 122 is not the same as the second instance of preemption notification 122, and therefore an additional instance of preemption notification 122 occurs. In another embodiment, directional preemption notification program 200 compares the direction of approach associated with multiple instances of preemption notification 122 to determine whether an additional instance of preemption notification 122 occurs. For example, directional preemption notification program 200 identifies a first instance of preemption notification 122 approaches from the north and a second instance of preemption notification 122 approaches from the east. As the directions of approach of the first instance and the second instance of preemption notification 122 are different, directional preemption notification program 200 determines an additional instance of preemption notification 122 occurs. In some other embodiment, directional preemption notification program 200 utilizes one or more of the aforementioned embodiments, to determine whether an additional instance of preemption notification 122 occurs. In the aforementioned embodiments, if directional preemption notification program 200 determines the first instance of preemption notification 122 matches the second instance of preemption notification 122, then directional preemption notification program 200 determines another instance of preemption notification 122 does not occur. Conversely, with respect to the aforementioned embodiments, if directional preemption notification program 200 determines the first instance of preemption notification 122 does not match the second instance of preemption notification 122, then directional preemption notification program 200 determines another instance of preemption notification 122 occurs.

If directional preemption notification program 200 determines an additional instance of preemption notification 122 occurs (decision 208, yes branch), then directional preemption notification program 200 identifies a direction of the approaching emergency vehicle (step 204). If directional preemption notification program 200 determines an additional instance of preemption notification 122 does not occur (decision 208, no branch), then directional preemption notification program 200 determines whether preemption notification 122 ceases (decision 210).

In decision 210, directional preemption notification program 200 determines whether preemption notification 122 ceases. In one embodiment, directional preemption notification program 200 determines preemption notification 122 ceases based on timing provided by a GPS navigation enables instance of preemptive traffic system 120. For example, directional preemption notification program 200 determines a priority vehicle passes through an intersection between 11:35 P.M. and 11:40 P.M. (e.g., GPS timing window) based on information within preemption notification 122. Directional preemption notification program 200 determines the current time is 11:41 P.M., and therefore preemption notification 122 ceases with respect to the intersection. Conversely if the current time is 11:37 P.M., directional preemption notification program 200 determines preemption notification 122 is still active (e.g., does not cease).

In another embodiment, directional preemption notification program 200 determines preemption notification 122 ceases based on GPS data sent from the priority vehicle. For example, the priority vehicle passes through an intersection. Based on the GPS coordinates of the priority vehicle and the GPS coordinates of the intersection, directional preemption notification program 200 determines preemption notification 122 ceases as the coordinates of the priority vehicle move away from the intersection. Conversely, if directional preemption notification program 200 determines the coordinates of the priority vehicle are before or within the intersection, then directional preemption notification program 200 determines preemption notification 122 is still active. In some other embodiment, directional preemption notification program 200 ceases to receive preemption notification 122 from a priority vehicle (e.g., vehicle stops transmitting preemption notification 122, driver turns off sirens and/or lights, etc.). Directional preemption notification program 200 determines preemption notification 122 based on the lack of a received instance of preemption notification 122.

In yet some other embodiment, directional preemption notification program 200 determines the source of preemption notification 122 is moving away from the intersection. For example, the signal strength of a received sound from a siren increases as the priority vehicle approaches an intersection and decreases as the priority vehicles moves away from the intersection. Directional preemption notification program 200 determines the priority vehicle leaves the intersection after identifying a peak signal strength, which then decreases, and determines preemption notification 122 ceases. Conversely, directional preemption notification program 200 determines a priority vehicle approaches an intersection as the signal strength of preemption notification 122 increases and is therefore still active. In another example, directional preemption notification program 200 monitors the camera data. Directional preemption notification program 200 determines the priority vehicle approaches the intersection and preemption notification 122 is active in response to identifying features associated with the front of the priority vehicle (e.g., headlights, windshield, face of a driver, etc.) Directional preemption notification program 200 determines the priority vehicle leaves the intersection and preemption notification 122 cease in response to determining the flashing lights are turned off, and/or identifying features associated with the back of the priority vehicle (e.g., back windshield, tail lights, etc.) after initially tracking front features.

If directional preemption notification program 200 determines preemption notification 122 ceases (decision 210, yes branch), then directional preemption notification program 200 stops preemption directional light indicators 112, preemption directional indicators 142, and/or preemption directional indicators 152 (step 212). If directional preemption notification program 200 determines preemption notification 122 does not cease (decision 210, no branch), then directional preemption notification program 200 determines whether additional instances of preemption notification 122 occur (decision 208).

In step 212, directional preemption notification program 200 stops preemption directional light indicators 112, preemption directional indicators 142, and/or preemption directional indicators 152. For example, directional preemption notification program turns off lights and/or audio cues that were previously provided through preemption directional light indicators 112, preemption directional indicators 142, and/or preemption directional indicators 152 to user and returns preemption directional light indicators 112, preemption directional indicators 142, and/or preemption directional indicators 152 to a null and/or inactive state. Directional preemption notification program 200 completes and returns to determine whether directional preemption notification program 200 receives preemption notification 122 (decision 202).

Figure 8:
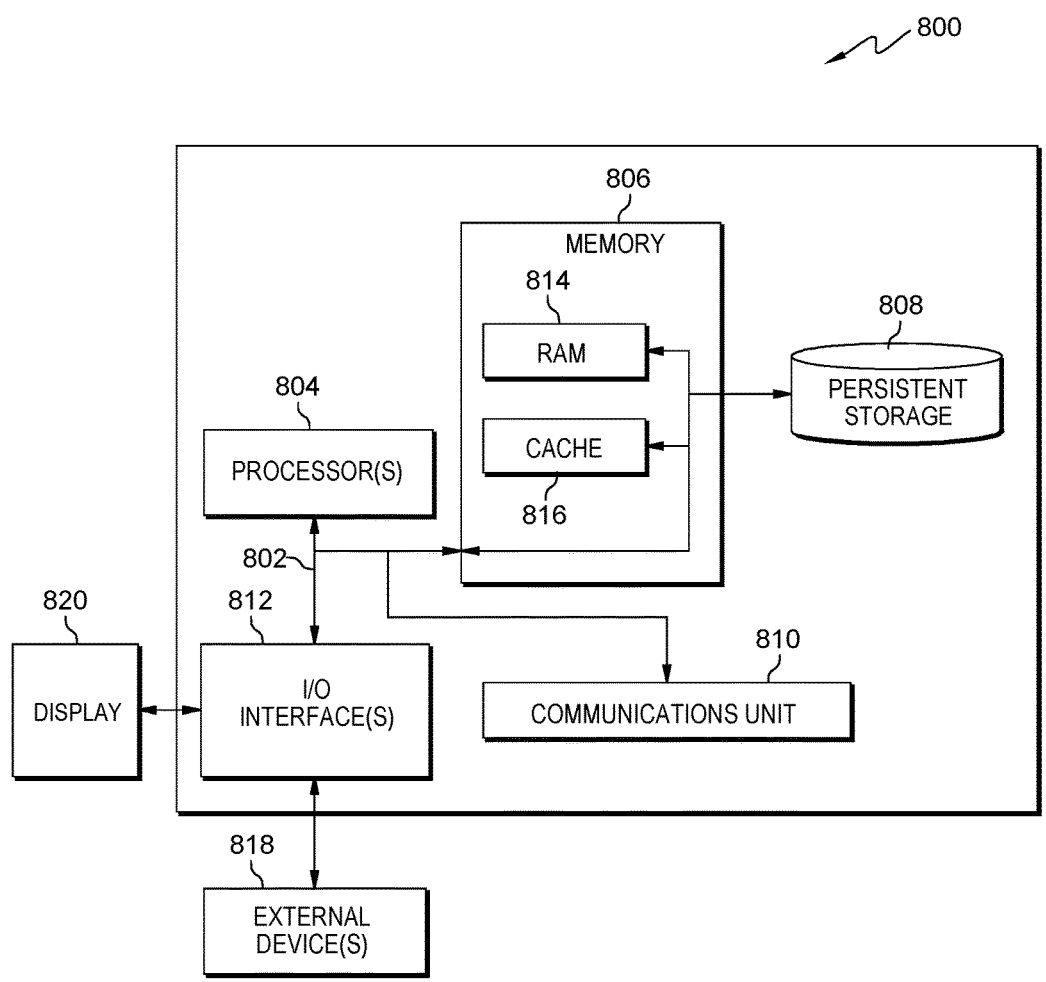
FIG. 8 is a block diagram of components of the computing device executing the directional preemption notification program, in accordance with an embodiment of the present invention.

FIG. 8 depicts a block diagram of components of computing device 800 in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computing device 800 includes communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM) 814. In general, memory 806 can include any suitable volatile or non-volatile computer readable storage media. Cache 816 is a fast memory that enhances the performance of computer processor(s) 804 by holding recently accessed data, and data near accessed data, from memory 806.

Preemption directional light indicators 112, preemption notification 122, preemption directional indicators 142, preemption directional indicators 152, and directional preemption notification program 200 may be stored in persistent storage 808 and in memory 806 for execution and/or access by one or more of the respective computer processor(s) 804 via cache 816. In an embodiment, persistent storage 808 includes a magnetic hard disk drive. Alternatively, or in addition to a magnetic hard disk drive, persistent storage 808 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Preemption directional light indicators 112, preemption notification 122, preemption directional indicators 142, preemption directional indicators 152, and directional preemption notification program 200 may be downloaded to persistent storage 808 through communications unit 810.

I/O interface(s) 812 allows for input and output of data with other devices that may be connected to computing device 800. For example, I/O interface(s) 812 may provide a connection to external device(s) 818, such as a keyboard, a keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., preemption directional light indicators 112, preemption notification 122, preemption directional indicators 142, preemption directional indicators 152, and directional preemption notification program 200, can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for notifying, the method comprising:

receiving, by one or more computer processors, one or more preemption notifications, wherein the one or more preemption notifications are associated with one or more priority vehicles;

identifying, by the one or more computer processors, a traffic light, a pedestrian signal, a railroad crossing signal, a light rail transit crossing signal, and an in-vehicle information system that are within range of the received one or more preemption notifications, wherein the in-vehicle information system includes a heads up display, a vehicle representation, a dashboard gauge, a global positioning system, a rear view mirror indicator, a side view mirror indicator, a video display, and an audio messaging system, wherein the traffic light, the pedestrian signal, the railroad crossing signal, the light rail transit crossing signal, and the in-vehicle information system include one or more directional indicators that include lights in a compass orientation, icons, symbols, text messages, audio notifications, and tactile notifications, wherein the compass orientation is a set of defined points that represent a direction as viewable by pedestrians and drivers, wherein the defined set of points identify a front direction, a right direction, a rear direction, and a left direction;

identifying, by the one or more computer processors, one or more directions of approach associated with the received one or more preemption notifications relative to the identified traffic light, the identified pedestrian signal, the identified railroad crossing signal, the identified light rail transit crossing signal, and the identified in-vehicle information system based on: GPS information within the received one or more preemption notifications, triangulation of the received one or more preemption notifications, and image processing of camera data associated with the identified traffic light, the identified pedestrian signal, the identified railroad crossing signal, the identified light rail transit crossing signal, and the identified in-vehicle information system;

identifying, by the one or more computer processors, an orientation of the identified traffic light, the identified pedestrian signal, the identified railroad crossing signal, the identified light rail transit crossing signal, and the identified in-vehicle information system;

identifying, by the one or more computer processors, one or more directions of approach associated with the received one or more preemption notifications relative to the identified traffic light, the identified pedestrian signal, the identified railroad crossing signal, the identified light rail transit crossing signal, and the identified in-vehicle information system with respect to the identified orientation of the identified traffic light, the identified pedestrian signal, the identified railroad crossing signal, the identified light rail transit crossing signal, and the identified in-vehicle information system;

determining, by the one or more computer processors, a number of approaching priority vehicles associated with each instance of the identified one or more directions of approach relative to the identified traffic light, the identified pedestrian signal, the identified railroad crossing signal, the identified light rail transit crossing signal, and the identified in-vehicle information system;

initiating, by the one or more computer processors, to display through the one or more directional indicators of the identified traffic light, the identified pedestrian signal, the identified railroad crossing signal, the identified light rail transit crossing signal, and the identified in-vehicle information system, the identified total number of approaching priority vehicles associated with the one or more identified directions of approach relative to the identified traffic light, the identified pedestrian signal, the identified railroad crossing signal, the identified light rail transit crossing signal, and the identified in-vehicle information system;

determining, by the one or more computer processors, whether the received one or more preemption notifications ceases based on the GPS information within the received one or more preemption notifications, the triangulation of the received one or more preemption notifications, and the image processing of the camera data associated with the identified traffic light, the identified pedestrian signal, the identified railroad crossing signal, the identified light rail transit crossing signal, and the identified in-vehicle information system; and responsive to determining that the received one or more preemption notifications cease, initiating, by the one or more computer processors, to stop display through the one or more directional indicators of the identified traffic light, the identified pedestrian signal, the identified railroad crossing signal, the identified light rail transit crossing signal, and the identified in-vehicle information system.

* * * * *